(12) United States Patent
Sylvester

(10) Patent No.: US 7,378,372 B2
(45) Date of Patent: May 27, 2008

(54) FILTER AND SORBENT FOR REMOVAL OF CONTAMINANTS FROM A FLUID

(75) Inventor: Paul Sylvester, Waltham, MA (US)

(73) Assignee: Layne Christensen Company, Mission Woods, KS (US)

( * ) Notice: Subject to any disclaimer, the term of this patent is extended or adjusted under 35 U.S.C. 154(b) by 186 days.

(21) Appl. No.: 11/247,446

(22) Filed: Oct. 11, 2005

(65) Prior Publication Data

US 2007/0080115 A1    Apr. 12, 2007

(51) Int. Cl.
*C01B 31/08* (2006.01)

(52) U.S. Cl. ............... 502/416; 502/417; 210/688

(58) Field of Classification Search ............... 502/416, 502/417; 210/688
See application file for complete search history.

(56) References Cited

U.S. PATENT DOCUMENTS 5,277,931 A * 1/1994 Maglio et al. ............ 427/212
2003/0224932 A1 * 12/2003 Saaski et al. ............ 502/416
2004/0089608 A1    5/2004 Vo
2005/0150835 A1 *  7/2005 Vo ............................ 210/660
2005/0156136 A1    7/2005 SenGupta et al.
2005/0221089 A1 * 10/2005 Reid et al. ................ 428/403
2005/0247635 A1 * 11/2005 Vo et al. ................... 210/685

FOREIGN PATENT DOCUMENTS

WO    20050823523 A1    9/2005
WO    2005092492 A1    10/2005
WO    2004007379 A1    1/2006

OTHER PUBLICATIONS

International Search Report and Written Opinion of the International Searching Authority. PCT/US2006/039933, mailed Mar. 19, 2007.
SenGupta et al., *Method of Manufacture and Use of Hybrid Anion Exchanger for Selective Removal of Contaminating Ligands from Fluids*, U.S. Appl. No. 10/925,600, filed Aug. 24, 2004.

* cited by examiner

*Primary Examiner*—Chester T. Barry
(74) *Attorney, Agent, or Firm*—Thompson Hine LLP

(57) ABSTRACT

Metal oxide modified or impregnated activated carbon as a sorbent to reduce multiple contaminants, such as arsenic and pesticide residues from a fluid.

14 Claims, No Drawings

FILTER AND SORBENT FOR REMOVAL OF CONTAMINANTS FROM A FLUID

FIELD OF THE INVENTION

The invention relates to use of a sorbent to remove contaminants from fluids such as drinking water.

BACKGROUND

Activated carbons are used in drinking water treatment to remove a range of organic compounds and other contaminants. However, activated carbons have a very low affinity for metal contaminants that may be present in water and other fluids.

SUMMARY OF THE INVENTION

An activated carbon sorbent impregnated with a hydrous metal oxide for removing contaminants, including metals, from drinking water and other fluids.

One embodiment of the invention is an activated carbon sorbent that contains particles of a hydrated metal oxide dispersed or impregnated in or on the carbon, the sorbent removing one or more contaminants from the fluid by using host carbon sorption and additional hydrated metal oxide sorption.

Another embodiment is a method for selectively removing at least one contaminant from a fluid stream (e.g., drinking water, industrial water) by contacting the fluid stream with the previously described sorbent for a time sufficiently short to allow point of use or point of entry contaminant removal or reduction.

Another embodiment is a method for reducing a contaminant from a fluid stream using a hydrous or hydrated iron oxide (HFO) impregnated activated carbon sorbent, contacting at least a portion of the sorbent with the fluid stream, thus obtaining a treated fluid stream having a reduced contaminant level. The method is economical, operationally simple, requires virtually no start-up time, and is forgiving toward fluctuations in feed compositions. The HFO-impregnated carbon sorbent is durable, exhibits selectivity toward the target contaminant(s), and is amenable to efficient regeneration and reuse. Removing the target contaminant does not cause major changes in pH or in the composition of the influent water.

The previously described sorbent may be contained in a filter. In this embodiment, it may be used in a drinking water container, a household purification system, a refrigerator line to dispense purified water and/or ice, etc.

These and other embodiments will be further appreciated with reference to the following description and examples.

DESCRIPTION

Activated carbon sorbents having particles of a hydrated metal oxide substantially dispersed or impregnated therein are disclosed. The inventive sorbent retains the functional sorption by carbon and additionally provides sorption by the hydrated metal oxide impregnated or dispersed therein. The inventive sorbent and method uses the ability of carbon to remove, for example, organic species from water, and further provides the additional ability to remove arsenic and other inorganic contaminants by sorption using the metal-oxide particles dispersed or impregnated in the carbon. These sorbents remove contaminants from fluid streams and have reaction kinetics that enable their location at a point of use (POU) or point of entry (POE). The modified or impregnated activated carbon sorbent exhibits excellent kinetics, hydraulic properties and durability during fixed bed column runs. The dispersed hydrated metal oxide or hydroxide particles serve as active sorbents for contaminants. The contaminant(s) removed by the sorbent may include arsenate, arsenite, dichromate, manganese, tin, platinum, iron, cobalt, chromate, molybdate, selenite, uranium, vanadium, vanadate, ruthenium, copper, zinc, antimony, molybdenum, tungsten, barium, cerium, lanthanum, zirconium, titanium, and/or radium, as well as natural organic material (NOM), pesticide and herbicide residues, endocrine disruptors, pharmaceutical residues and organic compounds released through industrial discharges. It will be appreciated by one skilled in the art that the terms dispersed, impregnated, or loaded are used synonymously with reference to hydrous metal oxide particles in or on the sorbent except as otherwise indicated.

A method of preparing metal hydroxide modified or impregnated fibers has been disclosed in U.S. Patent Application Publication No. 2005/0156136 to SenGupta, and in U.S. patent application Ser. No. 11/114,717, filed on Apr. 26, 2005, each of which is expressly incorporated by reference herein in its entirety.

Activated carbon, also termed activated charcoal, is an amorphous form of carbon. Activated carbon has no regular atomic structure, unlike other forms (allotropes) of elemental carbon such as diamond, graphite, fullerenes or nanotubes. It is available at least as Norit® (NORIT Americas, Inc., Marshall Tex.), Ultracarbon® (Merck Darmstadt, Germany), and various grades of activated carbons from at least Calgon Corporation (Pittsburgh Pa.) and Jacobi Carbons (Frankfurt Germany).

Charcoal is obtained by burning wood, nutshells, coconut husks, animal bones, and/or other carbonaceous (carbon-containing) materials. Charcoal becomes activated by heating it with steam to approximately 1000° C. in the absence of oxygen. This treatment removes residual non-carbon elements and produces a porous internal microstructure having an extremely high surface area; a single gram can have 400 to 1,200 square meters of surface area, 98% of it internal. Such porous material with high surface areas in the hundreds or thousands of square meters per gram as determined by the Brunauer, Emmett and Teller (BET) method, has an ability to absorb relatively non-polar organic species and oxidants such as hydrogen peroxide ($H_2O_2$), chlorine, hypochlorite, and permanganate.

The affinity of carbon for arsenic and many other inorganic contaminants is negligible. An oxidant-loaded or impregnated carbon however, can then be contacted with a solution of a ferrous salt as described. The iron impregnated carbon still has capacity to adsorb organic molecules but also has an affinity for arsenic and other inorganics as well.

In one embodiment, an activated carbon sorbent is pretreated (e.g. with nitric acid) to modify its surface properties to enhance iron uptake by either of the above-mentioned methods. The chemical nature of amorphous carbon, and its high surface area and porosity provides for adsorption and absorption of fluid (gas and/or liquid) contaminants. Adsorption indicates that the contaminant interacts with the surface of the carbon; absorption indicates that the contaminant is incorporated into the carbon structure through pores or interstices.

Hydrous iron oxides have a strong affinity for arsenate and other metals and/or oxyanions, such as vanadate, antimonate, and chromate that can occur as contaminants in potable water. The quantity of contaminant removed depends on the capacity of the activated carbon, on the affinity of the contaminant for the carbon, and on other factors.

Activated carbons exhibit a significant anion exchange capacity by having positively charged groups. This property can be utilized to precipitate hydrous iron oxides and other metal oxides throughout the carbon by preparing metal hydroxide modified or impregnated activated carbon, as will be further described. The activated carbon is contacted with an anionic oxidizing agent (e.g. persulfate, permanganate, hypochlorite, nitrate, nitrite, $FeO_4^{2-}$, perchlorate, bromate, iodate, and/or chlorite) and then washed with water to remove unbound oxidizing agents. The carbon is then contacted with a solution containing a metal salt, such as ferrous (Fe(II)) salts or manganous (Mn(II)) salts. The oxidant sorbed on the activated carbon oxidizes the ferrous ion to the ferric (Fe(III)) ion, which subsequently precipitates and disperses throughout the carbon as a hydrous oxide or hydroxide.

Because activated carbons are amphoteric substrates, in addition to an anion exchange capacity they also possess a significant cation exchange capacity by having negatively charged groups. Thus, in one embodiment, the previous method uses a cationic oxidant (e.g. cerium cation ($Ce^{4+}$); silver cation ($Ag^{2+}$)) in place of the anionic oxidant. The oxidant-loaded carbon is contacted with the solution of the ferrous salt.

The modified carbon sorbent may be washed and/or neutralized using a weakly basic solution such as sodium bicarbonate until it is free from unbound iron floc and the pH is neutral. The basic solution may contain a salt such as NaCl. The modified carbon sorbent may also be dried.

In one embodiment, the modified carbon sorbent is used in a household point of use or point of entry application. In this embodiment, the modified or impregnated activated carbon may be incorporated into a containment device to serve as a filter. The filter can be incorporated in a fluid stream that is connected to a refrigerator and/or freezer, such that filtered water may be used to make ice that is dispensed from the freezer and/or may be used to supply water that is dispensed from the refrigerator. A filter can be used in a water container, such as a pitcher, and may be an integral part of the pitcher or may be added as a separate component. A filter may be used in an individual filtration system, for example, it may be of a sufficiently small size to use as a countertop or under the sink component. It may be connected to a single faucet or a plurality of faucets. The impregnated carbon sorbent may be incorporated into filter mats, spiral wound media, woven media, or non-woven media for water treatment. The impregnated carbon sorbent may also be incorporated as a component with other treatment devices that are beads or granular sorbents.

The invention will be further appreciated with respect to the following examples.

EXAMPLE 1

Activated carbon (Norit HD300, NORIT America, Inc., TX), 25 g was stirred with 250 mL of a 1% potassium permanganate solution in water for about fifteen minutes. The permanganate solution was then decanted and the carbon washed with water to remove any unbound permanganate. The carbon was then stirred with 250 mL of a 10% solution of iron sulfate heptahydrate ($FeSO_4.7H_2O$) in deionized water for about five hours. The aqueous phase was decanted and the carbon washed with a 0.5% NaCl/0.5% $NaHCO_3$ solution until it was free from unbound iron floc and the pH was about 7. After remaining in the solution overnight, the solid product was dried on a Buchner funnel to remove any surface water. The mass of the final product was 48.7 g. The analysis of the final product gave the following results: water 46.6%; iron 67.6 mg/g of dried carbon; manganese 0.24 mg/g of dried carbon.

EXAMPLE 2

Activated carbon (Norit HD300, NORIT America, Inc., TX) 25 g is stirred with 250 mL of a 1% ammonium cerium(IV) sulfate (or other soluble Ce(IV) salt) oxide solution for about fifteen minutes. The oxide solution is then decanted and the carbon is washed with water to remove any unbound cation. The carbon is then stirred with 250 mL of a 10% solution of iron sulfate heptahydrate ($FeSO_4.7H_2O$) in deionized water for about five hours. The aqueous phase is decanted and the carbon is washed and neutralized with 0.5% w/v NaCl/0.5% w/v $NaHCO_3$ solution until it is free from unbound iron floc and the pH is about 7. After remaining in the solution overnight, the solid iron loaded carbon is dried (e.g. on a Buchner funnel) to remove any surface water.

Other variations or embodiments of the invention will also be apparent to one of ordinary skill in the art from the above description and examples. Thus, the forgoing embodiments are not to be construed as limiting the scope of this invention.

What is claimed is:

1. A first sorbent for removing at least one contaminant from a fluid, the first sorbent comprising first activated carbon modified to contain a plurality of first hydrated metal oxide particles substantially dispersed therein, the modified first activated carbon with a significantly greater capacity for arsenic and other inorganic metals and oxyanions compared to a second sorbent comprising first activated carbon modified by a direct precipitation method to contain a plurality of the hydrated metal oxide particles.

2. The first sorbent of claim 1 wherein the modified first activated carbon is impregnated with the hydrated metal oxide.

3. The first sorbent of claim 1 wherein the metal of the first hydrated metal oxide is selected from at least one of Cu, Mn, V, Sn, Pt, Fe, Co, Ce, La, Zr, Ti, or Ru.

4. A filter to reduce a level of at least one contaminant in drinking water, the filter comprising a first sorbent comprising first activated carbon modified to contain particles of a first hydrated metal oxide substantially dispersed therein with a significantly greater capacity for arsenic and other inorganic metals and oxyanions compared to a second sorbent comprising activated carbon modified by a direct precipitation method to contain a plurality of hydrated metal oxide particles, and a containment device containing the first sorbent.

5. The filter of claim 4 wherein the first sorbent is incorporated in at least one of a filter mat, a spiral wound medium, a woven medium, or a non-woven medium.

6. The filter of claim 4 associated with or integral with a drinking water container.

7. The filter of claim 4 associated with a household water purification system.

8. The filter of claim 4 associated with at least one water faucet.

9. The filter of claim 4 associated with a refrigerator water dispenser, a freezer ice dispenser, or combinations thereof.

10. A method for synthesizing a first sorbent comprising
  contacting activated carbon with an oxidant under conditions to form an oxidant-bound carbon sorbent,
  removing unbound oxidant from the oxidant-bound carbon sorbent, and
  contacting the oxidant-bound carbon sorbent with a metal salt solution under conditions to impregnate metal oxide in the activated carbon to result in a metal oxide-impregnated carbon sorbent with significantly greater capacity for arsenic and other inorganic metals and oxyanions compared to a second sorbent comprising activated carbon modified by a direct precipitation method to contain a plurality of hydrated metal oxide particles.

11. The method of claim 10 further comprising washing, neutralizing, and drying the carbon-impregnated metal oxide sorbent.

12. The method of claim 10 wherein the oxidant is an anionic oxidant selected from at least one of persulfate, permanganate, hypochlorite, nitrate, nitrite, $FeO_4^{2-}$, perchlorate, bromate, iodate, or chlorite.

13. The method of claim 10 wherein the oxidant is a cationic oxidant.

14. The method of claim 10 where a weakly basic solution is used to neutralize the first sorbent.

* * * * *